United States Patent [19]

Auriat

[11] 4,158,932

[45] Jun. 26, 1979

[54] PROCESS FOR FIXING SANDY TERRAINS

[75] Inventor: Edouard Auriat, Montrouge, France

[73] Assignee: Rhone-Poulenc-Textile, Lyons, France

[21] Appl. No.: 843,284

[22] Filed: Oct. 18, 1977

[30] Foreign Application Priority Data

Oct. 21, 1976 [FR] France ................... 76 32039

[51] Int. Cl.$^2$ ................... A01G 7/00; D01D 5/12
[52] U.S. Cl. ................... 47/9; 264/210 F; 47/26
[58] Field of Search ................... 47/9, 20, 31, 26; 264/210 R, 210 F; 28/255

[56] References Cited

U.S. PATENT DOCUMENTS

| | | | |
|---|---|---|---|
| 2,687,363 | 8/1954 | Manning | 47/9 X |
| 2,749,964 | 6/1956 | Manning | 47/9 UX |
| 3,181,273 | 5/1965 | West et al. | 47/9 X |
| 3,299,567 | 1/1967 | Perkins | 47/9 |
| 3,315,408 | 4/1967 | Fisher | 47/9 |
| 3,373,470 | 3/1968 | Joly | 28/255 |
| 3,433,866 | 3/1969 | Lombard et al. | 264/210 F |
| 3,691,004 | 9/1972 | Werner et al. | 47/9 X |
| 3,769,747 | 11/1973 | Chapman | 47/31 |
| 3,839,139 | 10/1974 | Ito et al. | 47/9 X |

FOREIGN PATENT DOCUMENTS

491253 7/1970 Switzerland ................... 47/20

OTHER PUBLICATIONS

Keeping the Sands from Shifting, Wash. Daily News, Nov. 3, 1956, p. 6.

*Primary Examiner*—Robert E. Bagwill
*Attorney, Agent, or Firm*—Sherman & Shalloway

[57] ABSTRACT

Sandy terrains are fixed against displacement by the wind of the sandy soil using at least one non-woven textile filament network. Erosion of the soil is thereby prevented or at least significantly reduced. The network is preferably formed from a tow of artificial or synthetic textiles in the form of continuous threads which are separated first into locks which are fixedly positioned in the ground and then the locks are separated or opened to form a regular or irregular open network.

Application of the non-woven network for fixing the surface soil of sandy zones prevents erosion and improves the planting and development of vegetation and crops.

5 Claims, No Drawings

PROCESS FOR FIXING SANDY TERRAINS

The present application relates to a process for preventing or reducing erosion of the soil of sandy ground by means of non-woven textile filament networks.

In sandy regions, for example, deserts or along coasts or in regions where the soil contains a high proportion of sand, the erosive effect of winds causes great economic and ecological damage. In fact, what happens is that either zones planted with trees or shrubs are turned to desert, or the wind displaces the sand, threatening wooded zones, crops and habitations, or light soils become unstable, preventing the normal development of crops from sowing to harvesting; in fact, under the influence of the wind, the sandy ground covers the crops or sweeps them away and the hoped-for result is not obtained.

In order to prevent erosion of and fix the sand, particularly in coastal zones, shrubs or vegetables such as sea-reed have been planted; however, the collection and transport of the sea-reeds is troublesome because of the large quantity to be planted out; furthermore, the cost of planting makes this process economically hardly viable, except in regions where labour is readily available.

In order to fix sandy ground, attempts have also been made to use vinyl emulsion sprays on the soil. From a technical point of view, the crust is destroyed by the wind, and this solution has been abandoned.

It has also been attempted to form a surface crust by spraying petroleum mulches. However, this crust is also removed by strong wind and the large weight of the amount of mulch which has to be transported into zones where access is generally difficult, as well as difficulties in transport from the refineries and difficulties in application of the mulch to the affected zones, all make this approach unsatisfactory.

U.S. Pat. No. 3,315,408 to Fisher describes a process for controlling soil erosion by providing a protective covering of soluble fibrous materials which are desintegratable under weathering conditions. The fibrous materials may be yarns, filaments or fibers and are preferably woven into a textile fabric but may also be otherwise interengaged or interconnected, such as by interlacing, braiding, wattling, twisting, or knitting to form a substantially continuous blanket covering as a loose or compactly associated mass. However, the cost for manufacturing this covering is economically undesirable.

The present application proposes a simple and inexpensive process for fixing sandy ground to reduce or prevent erosion thereof characterized in that at least one non-woven textile filament network is spread over the sandy zones.

The present application also provides a process for positioning at least one non-woven textile filament network over the sandy soil of sandy terrain, characterized in that one end of a tow of continuous filaments, preferably in the form of a coil or as wound upon a reel or spool, or other suitable package, is separated into several small locks or segments of filaments which are fixed to the soil by known means, at a certain distance from one another; thereafter, each of the locks are unwound from the tow under tension onto and over the soil while opening the locks by separating or spreading out the filaments; each of the locks are then fixed to the sandy soil at their other end, thereby creating a substantially regular non-woven network securely fixed to the sandy soil at each end and along the sides of the network, and preferably also at several places in the interior of the network.

A preferred manner of positioning the network is as follows: Preferably, prior to separating the tow into smaller locks or segments of filaments, the tow can be tied, clamped, cemented, or otherwise fixedly secured to a peg or post which is itself securely fixed to the sandy soil. Individual locks are separated from the tow and then spread out a relatively short distance from the post, so as to form, in essence, a series of radially extending lines, with the post as the apex, covering a triangular segment, whose height and base are still completely within the boundaries of the zone of sandy terrain to be protected, for example, the height of the triangle being about 1% to 20% of the length of the zone being protected, and the base of the triangle being about 10% to 70% of the width of the zone being protected. After fixing the ends of the locks at the base of the triangular segment, at a predetermined distance from each other, for example, one foot, one meter, etc., with or without previously separating the filaments, the locks are further unwound from the tow, under tension, while manually opening the locks by separating or spreading out the filaments of each of the locks. The end of each lock is then securely fixed to the soil by any suitable means, with other fixing points along the outer edges of the network, and preferably also within the interior portions of the networks. In opening the locks to spread apart the individual, or small groups of filaments, the filaments may cross over each other to provide a plurality of points of intersection, such that the finished open network has a spiderweb-like appearance. Also, where the continuous filaments of the tow have previously been adhered to each other at a plurality of points over the length of the tow, the open network will naturally include many apparent cross-over points of the individual, or small groups of filaments, to again provide a spiderweb-like or openwork appearance.

The filaments of the non-woven textile are derived from at least one tow of continuous threads of artificial or synthetic textile material. It is of course possible, without going outside the scope of the present invention to use tows of a mineral textile such as glass or metal filaments. Where a network which is to be fixed permanently over the sandy terrain is desired, it is preferred to use networks of textiles which are very stable to light and to weathering, especially those consisting of synthetic polymers, copolymers or mixtures of polymers, such as those based on vinyl chloride or acrylonitrile. If it is desired that the network should only provide protection against erosion for a limited time, for example, to allow seeds to germinate and/or plants to grow, it is preferred to use a network of an artificial textile or of a textile which has been rendered biodegradable, and which at one and the same time protects the crops without, however, interfering with their development and their harvesting.

In order to cover all the surface of the sandy terrain which it is necessary to protect, several networks are placed side by side, care being taken to juxtapose the networks along their edge so that there are no unprotected zones. The edges of each network may also overlap with the edges of adjacent networks. In order to achieve maximum efficiency and good stability of the whole, it is preferable to place the network in the dominant wind direction.

The tows used may consist of crimped or non-crimped filaments; the gauge of the filaments is preferably from 3 to 17 dtex and the overall gauge of the tow is in general between 10,000 dtex and 3,000,000 dtex.

The tow must be easily separable into smaller segments or locks and these must be able to open easily to create a regular open network. Preferably, the material is sized, allowing thread to slip over thread, and allowing easy opening of the tow; the opening of the tow must result in a network which can range up to 15 meters in width, but with the width of the network being related to the type and degree of protection desired. The length of each network can be widely varied, but for convenience in handling will generally range from about 20 meters to about 500 meters. The openings in the network are preferably just large enough to permit growth and development of plants or vegetation crops when such is desired. A tow which is suitable for carrying out the process of the present application is described in U.S. Pat. No. 3,433,866 to Lombard et al.; another suitable tow is described in U.S. Pat. No. 3,373,470 to Joly and the disclosures of these patents are incorporated herein by reference.

To prepare the tow for use in this invention it may, for example, be wound up on a reel, spool or the like or coiled or folded onto itself or it may be in the tightly packed form obtained in accordance with the process described in the published French Patent Application No. 2,264,751, assigned to the same assignee of this application.

The means of fixing the tow and one end and the individual locks and filaments of the network to the sandy terrain are not especially critical, but the use of pegs or posts, which may be wood, metal or plastic or which may even be branches has been found to be especially convenient. Other fixing means, such as staples, heavy weights, and the like, may also conveniently be used.

It is found that after a few days of wind, the sand which is transported, and which comes from unprotected zones, falls on the network, disappears under the latter and becomes fixed there until it is flush with, or slightly above, the surface of the network. From that moment onwards, any new excess sand continues on its course, but the sand of the protected and stabilized zone is no longer removed. If the sandy zone has been seeded before positioning the network, the seeds are thus held in place during germination, whereas, without the non-woven textile filament network of this invention, the wind carries away the sand with the seeds. The network placed on the ground thus makes it possible to plant some vegetation; it is found furthermore, that it favors the development of the vegetation by virtue of a greenhouse effect which is created under the network. The network can be colored to enhance visibility and it can also be impregnated with insecticide, repellent scents, fertilizers and the like.

The following examples illustrate the present application without implying any limitation.

EXAMPLE 1

A zone of sandy dunes is protected by covering the top of the dunes using tows of about 100,000 crimped filaments, each of 3.9 dtex, obtained by spinning a solution of polymers containing 82% of polyvinyl chloride and 18% of chlorinated polyvinyl chloride, as follows:

At one end, the tow is separated into 10 locks of approximately equal size which are fixed in the ground by means of 50 centimeters long pegs driven firmly into the soil at one meter from one another; the tow is then positioned by walking backwards and holding the tow under tension; the locks are manually opened to spread out the filaments, which are held in the spread-out position by fixing the edges with pegs inserted into the ground. The other end of the tow is fixed to the ground, a small segment of filaments at a time, in the same way as at the start; the network obtained is 10 meters wide and 100 meters long. A few pegs are inserted into the middle of the network to maintain a certain uniformity of covering of the ground. Several networks are thus produced and placed side by side, with the edges superposed to provide a total coverage of about 1000 meters. After six (6) months, it is found that the top of the dunes has not moved and that erosion has been limited.

EXAMPLE 2

Sandy coastal ground, in which sea-reeds have been sown, is covered using a tow of 27,000 crimped filaments each of 11 dtex, obtained by spinning polyacrylonitrile.

As in Example 1, several networks, each 10 meters wide are produced and placed side by side with the edges superposed.

After six (6) months, it is found that the seeds have germinated and that the network has served to protect both the seeds and the sand, the transport of which it prevents.

EXAMPLE 3

A protective network for a light soil containing up to 70% of sand, in which wheat has been sown, is produced, as in Example 1, using a tow of 27,000 crimped filaments each of 11 dtex, consisting of viscose.

After a certain time, when the soil becomes stabilized to the wind, good germination, and growth of the wheat through the network, are found. After two (2) months, the networks have undergone extensive degradation under the effect of the sunlight and allow harvesting when the wheat is ripe, but do not interfere with its growth, thus making it possible to improve the yield per hectare, in particular, in pre-desert zones.

What is claimed is:

1. A process for fixing sandy ground to prevent or reduce erosion thereof, comprising spreading in a fixed position over at least a portion of the sandy ground, at least one non-woven textile filament network produced from at least one tow of continuous filaments, wherein at least one textile filament network is fixedly positioned over at least a portion of the sandy ground by the steps of separating one end of a tow of continuous filaments into several locks which are fixed to the sandy ground, unwinding the locks under tension, separating the filaments of the locks to form an open network, and fixing the other end of the locks to the sandy ground, the gauge of the filaments being from about 3 to 17 dtex and the overall gauge of the tow is from about 10,000 to 3,000,000 dtex.

2. The process according to claim 1, wherein the tow of continuous filaments consists of synthetic textile filaments.

3. The process according to claim 1 wherein the continuous filaments are biodegradable.

4. The process according to claim 1, wherein the tow of continuous filaments consists of mineral textile filaments.

5. The process according to claim 1, wherein the sides of the open network are also fixed to the sandy ground.

* * * * *